United States Patent [19]

Schewe

[11] Patent Number: 4,951,166

[45] Date of Patent: Aug. 21, 1990

[54] THIN-FILM MAGNETIC HEAD WITH LAYER STRUCTURE AND WITH POLE PIECES OF VARYING WIDTHS

[75] Inventor: Herbert Schewe, Herzogenaurach, Fed. Rep. of Germany

[73] Assignee: Siemens Aktiengesellschaft, Berlin & Munich, Fed. Rep. of Germany

[21] Appl. No.: 254,451

[22] Filed: Oct. 6, 1988

[30] Foreign Application Priority Data

Oct. 16, 1987 [DE] Fed. Rep. of Germany ....... 3735147

[51] Int. Cl.$^5$ ..................... G11B 5/187; G11B 5/23; G11B 5/147
[52] U.S. Cl. ................................ 360/119; 360/122; 360/125; 360/126
[58] Field of Search ............... 360/122, 119, 125, 126

[56] References Cited

U.S. PATENT DOCUMENTS 4,321,641 3/1923 Lee ....................................... 360/126
4,575,777 3/1911 Hosokawa ........................... 360/123

FOREIGN PATENT DOCUMENTS

0012913A1 7/1980 European Pat. Off. .
0101352A1 2/1984 European Pat. Off. .
0137051 4/1985 European Pat. Off. .
0232505A1 8/1987 European Pat. Off. .
59-79411 5/1984 Japan .
61-904 1/1986 Japan .

OTHER PUBLICATIONS

"A New Type of Magnetic Head May Be Just Around the Corner", Electronics, May 14, 1987 pp. 31–32.
"Erase Profiles of Floppy Disk Heads", IEEE Transactions on Magnetics, vol. Mag-20, No. 4, Jul. 1984, pp. 528–541.
European Search Report No. RS 79905 DE.
"Discrete Tracks for Saturation Magnetic Recording", IEEE Transactions on Electronic Computers, E.C.-12 (1963,08), 4, 383–387.
"Perpendicular Magnetic Recording", IEEE Transactions on Magnetics, vol. Mag-16, No. 1, Jan. 1980, pp. 71–76.
"Perpendicular Magnetic Recording–Evolution and Future–", IEEE Transactions on Magnetics, vol. Mag-20, No. 5, Sep. 1984 pp. 657–662.

*Primary Examiner*—Robert S. Tupper
*Attorney, Agent, or Firm*—Kenyon & Kenyon

[57] ABSTRACT

Thin-film magnetic head has a layer structure for vertical magnetization. The magnetic head is constructed in thin-film technology and is guided over a recording medium to be magnetized vertically. The head includes a ring core head magnetic guide body with a first and second magnetic shank which form sequentially arranged magnetic poles. The write function is carried out with the first magnetic shank and both magnetic shanks carry out the read function. This magnetic head is constructed so that the concomitant reading of data residues in the margin regions of data tracks is prevented. To this end the magnetic pole of the first magnetic shank has a greater width than the magnetic pole of the second magnetic shank with both magnetic shanks being constructed largely of the same material at least in their end regions bordering on the magnetic poles.

15 Claims, 3 Drawing Sheets

THIN-FILM MAGNETIC HEAD WITH LAYER STRUCTURE AND WITH POLE PIECES OF VARYING WIDTHS

BACKGROUND OF THE INVENTION

1. Field of the Invention

The present invention relates to a thin-film magnetic head layer structure including two magnetic shanks. More particularly, the invention relates to a unique combination configuration for the two magnetic shanks whereby a reading pole including one of the magnetic shanks reads an area narrower than an area written by a writing pole of the other magnetic shank.

2. Related Art

A thin-film magnetic head is to be guided over a data track of a magnetizable recording medium. The head employs one of the known principles of storing data on a recording medium.

The principles of storing data on a recording medium, such as a disk-shaped medium, using longitudinal (horizontal) magnetization or perpendicular (vertical) magnetization are generally known as disclosed in "Perpendicular Magnetic Recording", IEEE Transactions on Magnetics, Vol. MAG-16, No. 1, January 1980, pages 71 to 76 or "Perpendicular Magnetic Recording - Evolution and Future", IEEE Transactions on Magnetics, Vol. MAG-20, No. 5, September 1984, pages 657 to 662 and "Perpendicular Magnetic Recording - Its Basics and Potential for the Future" appearing in the same publication at pages 675 to 680. A magnetic head utilizing one of these principles may contain a magnetic ring core head type guide body that carries a magnetic flux with a first and a second magnetic shank. These magnetic shanks may each have at least one magnetic layer with a predetermined magnetic response behavior. Also, the shanks may form magnetic poles facing the recording medium, which poles are arranged sequentially with respect to a relative direction of motion of the magnetic head with respect to the recording medium. The poles are separated by a predetermined gap width and have predetermined width that is transverse to the relative direction of motion. The magnetic shanks also form the boundary of an intermediate area outside the pole region through which the windings of a write and/or read coil Winding extend.

A corresponding magnetic head can be found, for example in European Patent Application EP-A-O 232 505 corresponding to U.S. Pat. No. 4,742,413 assigned to the Assignee of the present application. This magnetic head writes with a quasi-single pole head using only a single magnetic shank operating by vertical magnetization. To this end, the two magnetic shanks are so formed that they show different magnetic responses during the write function rendering only one of the poles effective. The read function, in contrast, is carried out with both magnetic shanks.

Manufacturing technology for known magnetic heads for longitudinal magnetization with stepwise structure of the layers of their individual magnetic shanks and with a subsequent microstructuring can produce a first magnetic shank deposited first on a nonmagnetic substrate. In the region of a magnetic pole of the first shank, the shank has a somewhat greater width that is transverse to the relative direction of motion of the head with respect to the recording medium than the magnetic pole of the later deposited second magnetic shank. If, however, writing takes place with such a longitudinal magnetic head, it becomes apparent that in this process the width of the magnetic pole of the second magnetic shank, which is narrower than the magnetic pole of the first shank, is predominantly effective. In reading, however, the magnetic margin fields effect a flattened decrease of the read field profile toward the margin between the two magnetic poles. Therefore, it is possible to speak of concomitant reading of the right and left margin regions of the track by the margins of the broader magnetic pole, i.e. of the margin of the broader magnetic pole of the first magnetic shank that extends laterally beyond the narrower magnetic pole of the second magnetic shank.

In data storage systems with high data densities that use the vertical magnetization principle, track guidance systems are required to ensure guidance of the corresponding magnetic heads over the data tracks with a high track locking accuracy "sf" of, for example, less than $\pm 0.5$ $\mu$m. Corresponding track guidance systems are known, for example, as "Dedicated Servo Systems". However, the writing of neighboring tracks to be carried out with corresponding tolerances must be taken into consideration. The result is a track guidance error greater than the mentioned $\pm 0.5$ $\mu$m. If the mentioned magnetization conditions in known longitudinally magnetizing magnetic heads having different widths of their magnetic poles are taken as the basis, then a track guidance error of the mentioned Dedicated Servo Systems of the indicated order and magnitude consequently leads to the fact that after repeated overwriting of a data track the lateral margins of the data tracks loose sharpness They become "frayed." In an extreme case the gap region between neighboring data tracks, frequently referred to as a "lawn" which may be 3 to 4 $\mu$m wide for example, is at least in some locations completely written over. This means that in the margin region of the data tracks insular data residues of different overwrite processes can remain. When reading these tracks read errors may occur due to the ability of the margin regions of the broader magnetic pole of the first magnetic shank to read the margin regions of the track.

Due to this difficulty combined magnetic heads have been developed which in writing inductively lay down a broad track and in reading using an integrated narrower magnetoresistive sensor to read a track with a width narrower than that for writing. Such heads are disclosed in an article entitled "A NEW TYPE OF MAGNETIC HEAD MAY BE JUST AROUND THE CORNER" in Electronics, May 14, 1987, pages 31 and 32. The expenditures required for the manufacture of these highly complex heads are considerable. In addition, the sensitivity of magnetoresistive heads to magnetic spreading or strewing, which is well known, can lead to problems.

SUMMARY OF THE INVENTION

The present invention solves the above-mentioned problems by providing a thin-film magnetic head which avoids the creation of the above mentioned island-shaped data residues on the recording medium and also prevents the concomitant reading of such residues.

According to the present invention, a magnetic pole of a first magnetic shank, which, with respect to the relative direction of motion of the magnetic head with respect to a magnetic recording medium, is the leading magnetic shank of the magnetic head, has a greater width transverse to the relative direction of motion than the magnetic pole of the second magnetic shank which is the trailing magnetic shank. Both magnetic shanks are largely constructed of the same material at least in their end regions bordering on their respective magnetic poles.

The magnetic head according to the present invention uses the principle of vertical magnetization. The magnetic head of the present invention functions in a manner similar to a single pole head in a write operation and during a read operation has the characteristics of a thin-film ring core head. Due to the possibility of being able to activate different regions of the magnetic poles during reading and writing the magnetic head according to the present invention permits writing a wide track through the selection of a large pole width for the first (leading) magnetic pole, and reading a narrower track through selection of a lesser pole width for the second (trailing) magnetic pole. This special property of the magnetic head according to the present invention is in contrast to the above described experience in thin-film magnetic heads for recording with longitudinal magnetization. It is known that with the known heads for longitudinal magnetization a wider leading magnetic pole and a narrower trailing magnetic pole yield a read track which is by no means narrower than the write track.

The advantages connected with the implementation according to the invention of the thin-film magnetic head can be found in particular in that a reduced sharpness or a fraying of the write track margins due to unavoidable tolerances of a servo system that is always required for track guidance of the magnetic head no longer is of essential significance, since these margins are no longer detected during a read operation.

Further, the magnetic head of the present invention may include an arrangement whereby the magnetic pole of the first magnetic shank has a thickness greater than or equal to the thickness of the magnetic pole of the second magnetic shank where such thickness is measured along the relative direction of motion.

The widths of the magnetic poles of the two magnetic shanks transverse to the relative direction of motion may be selected so that write and read tracks are generated which satisfy the equation: $Wb_{min} - Rb_{max} > 4 \times sf$, where $Wb_{min}$ is a minimum write track width, $Rb_{max}$ is a maximum read track width and sf is a maximum track guide error.

The magnetic head of the present invention may also include end regions of each magnetic shank bordering on the respective magnetic poles where the end regions have narrow side faces that form an angle with respect to the relative direction of motion whereby said angle is approximately equal to zero degrees.

The magnetic head may further include a substrate formed as an aerodynamic flying body wherein the magnetic shank structure is disposed on a rearward flat face of the substrate.

DETAILED DESCRIPTION

In the Figures, identical parts have identical reference numbers.

Figure 1:
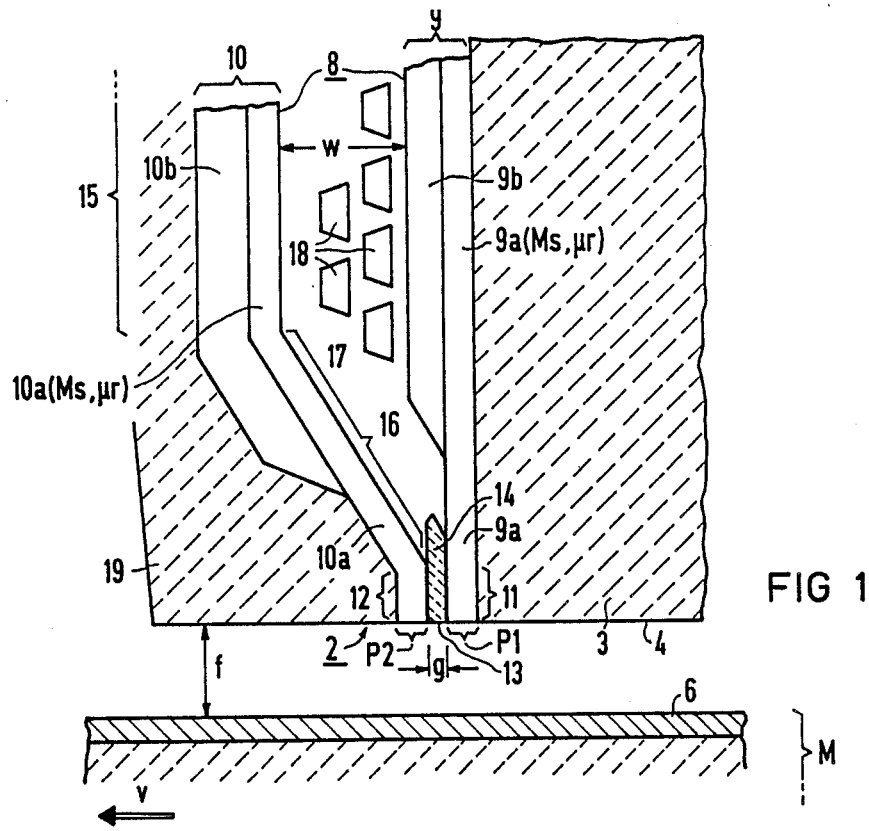
FIG. 1 shows a magnetic head according to an embodiment of the present invention.

In the magnetic head shown in FIG. 1, a design similar to a ring core head with layer construction as has been developed for the principle of perpendicular or vertical magnetization is the longitudinal section starting point. A read and a write function according to the principle of perpendicular magnetization are carried out with the magnetic head 2. The head 2 is located on the rearward flat side of a non-magnetic substrate 3, which is formed as an aerodynamic flying body with flying skids as disclosed for example, in European Patent Application EP-A-O 137 051. The magnetic head is thus to be guided aerodynamically over a recording medium M with low flying altitude "f", with the relative direction of motion of the recording medium with respect to the magnetic head being indicated by an arrow denoted by "v". The flying altitude "f" between the recording medium M and the underside 4 of head 2, which is formed with at least one flying skid and faces the recording medium, is, for example, only a few tenths of one $\mu$m. Recording medium M, in particular a magnetic storage disk, has a storage layer 6 which is oriented vertically and consists, for example, of a CoCr alloy.

The magnetic head 2 contains a magnetic guide body 8 similar to a ring core head. The magnetic guide body 8 carries the magnetic flux, with a first magnetic shank 9 and a second magnetic shank 10 which can, in a known manner, be constructed by lamination of several thin layers. These shanks include end regions 11 and 12 respectively, that face the recording medium M and form magnetic poles P1 and P2 respectively. These shanks are largely oriented at least in their end regions to be approximately perpendicular to the surface of the recording medium. An end region is defined as the end piece of a magnetic shank which has a largely uniform transverse thickness and extends approximately parallel to the end piece of the other magnetic shank. End regions 11 and 12, and thereby poles P1 and P2 respectively, are spatially separated by an air gap 13 which advantageously has a small longitudinal width g of less than 1 $\mu$m. This gap width is in the relative direction of motion v of the magnetic head with respect to the medium M.

The air gap 13 is filled by a very hard gap layer 14, of, for example, $Al_2O_3$ or $SiO_2$. In a central region 15 of the magnetic guide body 8 the distance between the two magnetic shanks 9 and 10 is widened as compared to gap width g. The rearward or trailing magnetic shank 10, i.e. rearward with respect to the relative direction of motion v leads to a greater width w with respect to the leading magnetic shank 9 formed in a planar manner and facing substrate 3. Outside of the central region 15, on the side of guide body 8 facing away from the recording medium M, the magnetic shank 10, is attached to the magnetic shank 9 in a connecting region in a known manner (not shown in the Figure) so that the ring core head shape of the guide body 8 results. At least one flat coil winding 18 extends through an interstitial space 17 formed between the two magnetic shanks 9 and 10 in the central region 15. The coil winding functions as a write coil as well as a read coil.

The two magnetic shanks 9 and 10 of magnetic head 2 are, at least in their end regions 11 and 12, in each instance formed by at least one magnetic layer 9a and 10a respectively. Outside of these end regions the two magnetic shanks 9 and 10 are additionally provided with at least one magnetic reinforcing layer 9b and 10b respectively. All layers of the magnetic shanks consist advantageously at least largely of the same material having a predetermined saturation magnetization Ms and a predetermined reversible permeability $\mu r$. The reversible permeability in an increasing region 16 of the magnetic shank 10 can be reduced by using different sputtering conditions in this region. Specific NiFe alloys or permalloy are suitable materials for the magnetic shanks. In addition, in the Figure an insulating external protective layer 19 of the magnetic head is shown, which may consist of $Al_2O_3$.

According to an embodiment of the present invention the magnetic shanks 11 and 12 are to be formed having different width transverse to the relative direction of motion v. This design is evident from the oblique view of FIG. 2 onto the pole surfaces of poles P1 and P2 of these magnetic shanks. The leading magnetic shank 9 facing substrate 3 is to have a greater width b1, while the trailing magnetic shank 10, separated from the leading magnetic shank 9 by gap 13, is narrower and has width b2. Widths b1 and b2, to be measured transverse to the relative direction of motion v, are selected so that the magnetic shank 10 does not touch the margin curve of an actually written data track. The selection takes into account the track following accuracy of the servo systems used for the magnetic head.

Figure 2:
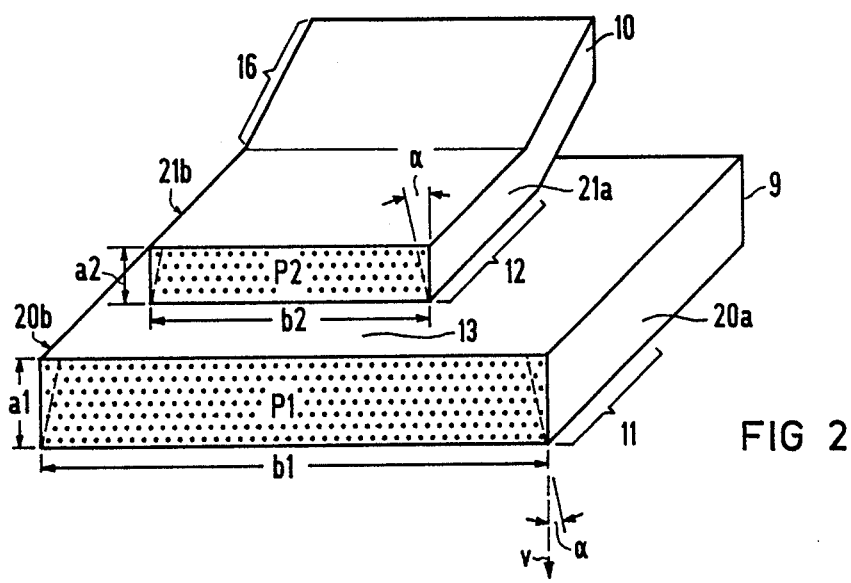
FIG. 2 illustrates in greater detail the magnetic poles of the magnetic head of FIG. 1.

As can be further seen in FIG. 2, the area of the pole P1, largely writing alone, is not greater than the area of the trailing pole P2. The thickness a1 to be measured in the direction of motion v of pole P1 can be greater than the corresponding thickness a2 of pole P2. However, in view of the single pole property of the head such proportioning of thicknesses is not absolutely required. Therefore, a2 can also be approximately equal to a1.

In FIG. 2, moreover, the narrower side faces of the two magnetic shanks 9 and 10 in their end regions 11 and 12 forming the magnetic poles P1 and P2 are labeled 20a, 20b and 21a, 21b respectively. According to the embodiment illustrated in FIG. 2, these side faces 20a, 20b and 21a, 21b form an inclination or angle $\alpha$ with respect to the relative direction of motion v which is as small as possible and preferably approximately zero degrees which is advantageous. As is intended to be indicated by the dashed lines in FIG. 2, side faces can also be provided that are oriented obliquely with respect to the direction of motion v for reasons of manufacture.

Writing takes place for all practical purposes only with the broader, leading magnetic shank 9 due to the selected width ratios for the magnetic head according to the embodiment of the present invention. Through the selection of the lesser width b2 for the trailing magnetic shank 10 a narrower track is read out with both shanks 9 and 10.

Figure 3:
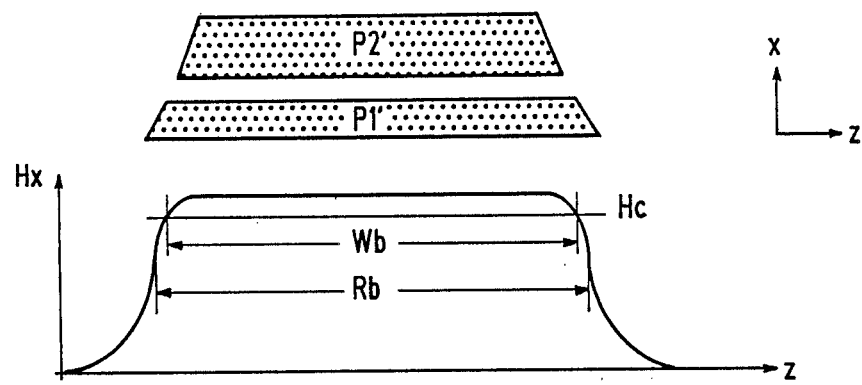
FIG. 3 illustrates the magnetic poles of a known magnetic head according to the principle of longitudinal magnetization.

This property of the magnetic head according to this embodiment of the present invention is surprising in view of the experiences with magnetic heads for longitudinal magnetization. In the case of longitudinal magnetization a wider leading magnetic pole and a narrower trailing magnetic pole lead to a write track which is narrower than the read track. To illustrate this, reference is made to FIG. 3 in which a view of the two pole surfaces P1' and P2' of a corresponding magnetic head can be found. The assumption was made here that due to the etching technique selected for structuring of the two magnetic shanks the trailing magnetic shank, with its pole P2', has a width to be measured in the z-direction, transverse to the relative direction of motion x, which is somewhat smaller than the width of the leading magnetic shank with pole P1', to be measured correspondingly, for reasons of manufacture. FIG. 3 shows, further, a graph of the field strength Hx of the magnetic field generated by the two magnetic poles as a function of the transverse extent in the z-direction of the magnetic head. The resulting field strength Hx plotted along the ordinate is measured on the surface of a corresponding recording disk to be longitudinally magnetized in the relative direction of motion x. The magnetic head of FIG. 3 writes with the trailing pole P2', its longitudinal Hc profile generated with the air gap. The storage layer of the disk is magnetized to the coercive field strength Hc. In contrast, the same head, when reading, scans the magnetization distribution in the disk with its entire lateral field characteristic. Consequently, the reading width Rb is greater than the writing width Wb determined by the coercive field strength Hc.

A measuring method for determining reading and writing widths of magnetic heads is known from, for example, the article "Erase Profiles of Floppy Disk Heads" IEEE Transactions on Magnetics, Vol. MAG-20, No. 4, July 1984, pages 528 to 541. The principle underlying this method consists essentially in that two tracks having different widths Wb are written. These tracks are then read out with a magnetic head. This head is guided at different distances from the written tracks with respect to the center of the track and the particular read voltage is measured. On the basis of the voltage profiles obtained in this manner two variables (quantities) can then be determined which correspond to the width of the write track or the read track. A unique assignment of these two quantities is possible if a written track is erased at the margin so that the write width Wb is smaller than the read width Rb.

This known method can be used to determine the write and read track width for a magnetic head which is to be guided over a corresponding recording medium in accordance with the principle of longitudinal magnetization and whose leading magnetic shank has a greater pole width than its trailing magnetic shank. It can then be readily determined that in this case for the magnetic head the read width is greater than the write width.

If, in contrast, a magnetic head according to the present invention is studied with a storage medium that is to be vertically magnetized then the corresponding analysis leads to different results. Under these circumstances a track is written which is broader than the track that is read out. This fact is also independent of whether or not a soft-magnetic base such as a NiFe alloy is provided for storage medium including a storage layer such as of CoCr. As disclosed in "IEEE Transactions on Magnetics", Vol. MAG-15, No. 6, November 1979, pages 1456 to 1458). It can thus be seen that with a magnetic head according to the present invention it is possible to write wide and read narrow over a storage medium to be magnetized vertically through the suitable selection of the pole widths of poles P1 and P2.

Figure 4:
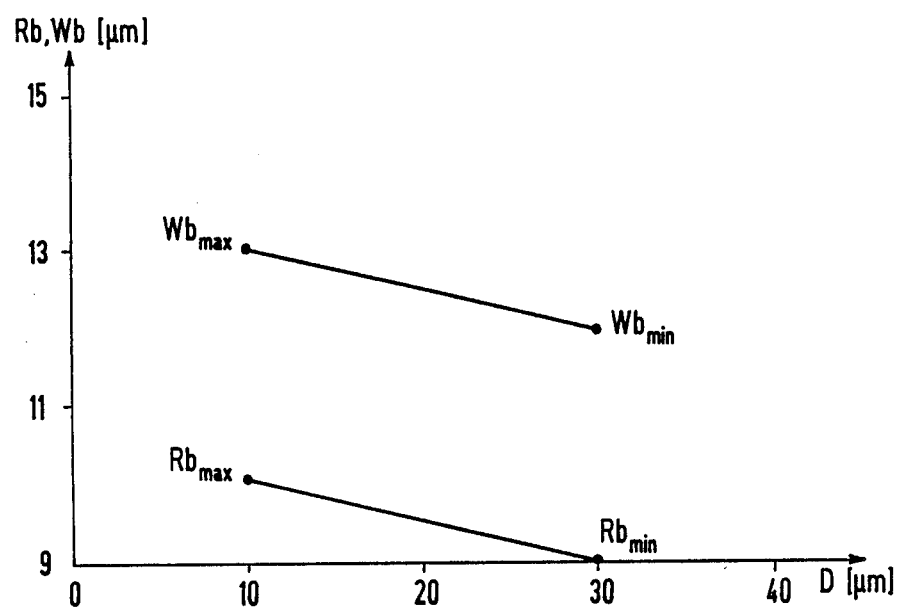
FIG. 4 shows the read and write track widths to be generated with a magnetic head according to an embodiment of the present invention as a function of the write frequency.

This fact is evident in the diagram of FIG. 4. In this diagram the track width Wb or Rb is plotted on the ordinate while the density of flux change D is given on the abscissa. The two measurement curves Wb and Rb are based on a magnetic head according to FIGS. 1 and 2 whose leading magnetic shank had a magnetic pole P1 with pole width b1 of approximately 13 μm and whose trailing magnetic shank has a magnetic pole p2 with pole width b2 of approximately 9 μm. The head in the region of the pole has the following dimensions: a1=0.8 μm, a2=0.6 μm; g=0.2 μm. Both magnetic shanks of the head consist of several layers of a specific NiFe alloy or permalloy. This head was guided over a magnetic storage disk which had a storage layer 6 of CoCr on a soft-magnetic NiFe base. The thickness of the CoCr layer was 0.4 μm, the thickness of the NiFe layer 0.5 μm. This CoCr/NiFe double layer had the following magnetic parameters: coercive filed strength Hc = 40 kA/m, saturation magnetization Ms = 250 kA/m, anisotropic (y) field strength Hk = 350 kA/m. As can clearly be seen in the diagram, at the densities of flux change D which can be realized in data storage systems with high storage density for this magnetic head the write track width Wb is considerably greater than the read track width Rb using this magnetic head. Track widths of 13 μm and 10 μm were obtained as maximum write or maximum read width $Wb_{max}$ and $Rb_{max}$ respectively. The minimum write and read widths $Wb_{min}$ and $Rb_{min}$ were 12 μm and 9 μm respectively.

Figure 5:
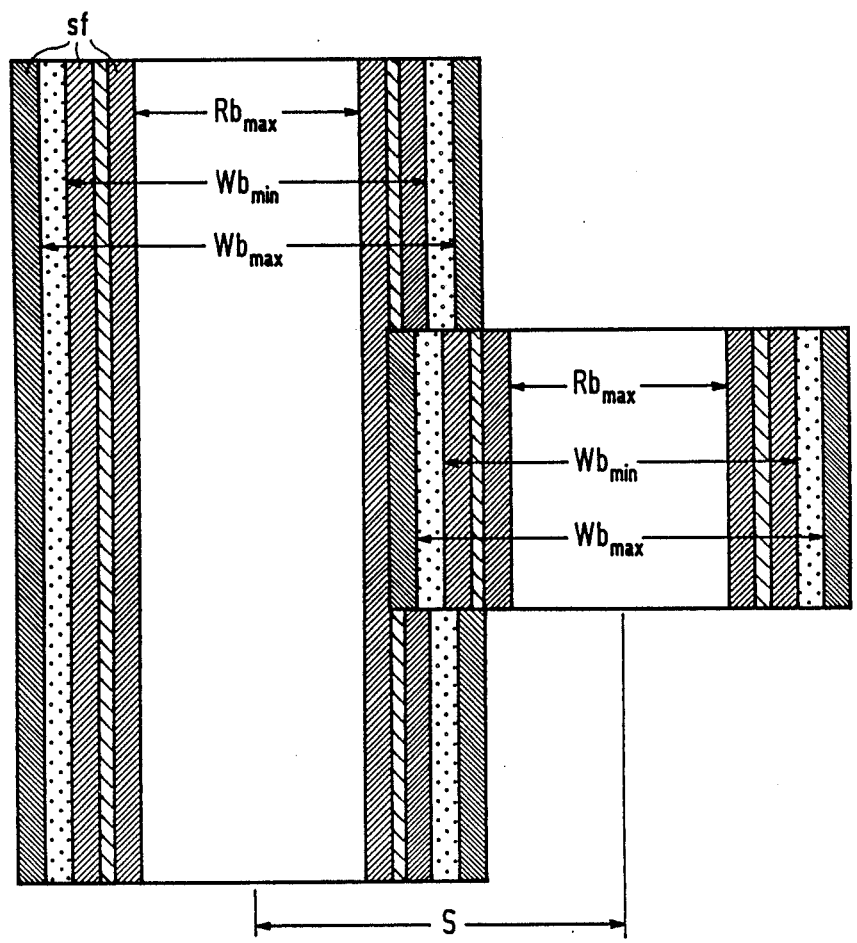
FIG. 5 shows maximum track subdivision achieved with a magnetic head according to an embodiment of the present invention.

Due to the fact that with the magnetic head according to the present invention a write track is generated which is wider than the read track, a relatively dense track distribution on a corresponding recording medium can be achieved. This track distribution is illustrated schematically in FIG. 5 in a top view of the recording medium. The critical case in which approximately no concomitant reading takes place is the basis for this Figure. The lack of concomitant reading is the result of sharply delimited write and read track widths.

$Rb_{min}$ and $Rb_{max}$ and $Wb_{min}$ and $Wb_{max}$ signify the minimum and maximum read and write track widths respectively corresponding to the embodiment whose characteristics are set forth in FIG. 4. A maximum mechanical tolerance sf*, unavoidable in track following, equals the maximum track guidance error of the drive of the recording medium and the magnetic head guidance. The following condition must be fulfilled:

$$Wb_{min} - Rb_{max} > 4 \times sf,$$

where sf is the positioning accuracy of a head on a single track. If it is considered that $Wb_{max} \approx b1$ and $Rb_{max} \approx b2$, then $Wb_{min}$ can be determined on the basis of the decrease according to FIG. 4 in order to fulfill the above condition.

With this condition, a minimum track raster S is obtained:

$$S = ((Wb_{max} + Rb_{max})/2) + (2 \times sf^*).$$

As a rule, the positioning accuracy sf on a given track is better than the precision sf* with which the track raster can be maintained, i.e. sf* ≧ sf applies.

Example: If the positioning accuracy of a drive and guidance systems, for example, through a dedicated and embedded servo is represented by:

sf = sf* = 0.5 μm, then for the minimum track raster S = 12.5 μm; whereby $Rb_{min}$ = 9 μm, $Rb_{max}$ = 10 μm $Wb_{min}$ = 12 μm, $Wb_{max}$ = 13 μm In the above described embodiment of the present invention an assumption was made that the leading magnetic shank 9 has the greater pole width b1 and that with this shank the write function is completed. However, the trailing shank can potentially also have the greater pole width and function as the writing shank. This is possible if the leading magnetic shank, which would then be the narrower shank, is arranged embedded in the substrate as disclosed in European Patent Application EP-A-O 185 289.

What I claim is:

1. An apparatus including a thin-film magnetic head to be guided over a data track of a perpendicularly magnetizable recording medium comprising:

a magnetic ring core head guide body for carrying a magnetic flux, including a first and a second magnetic shank, wherein each magnetic shank comprises at least one magentic layer with a predetermined magnetic behavior;

two magnetic poles facing the recording medium which are arranged sequentially relative to a direction of motion of the magnetic head with respect to the recording medium, each of said poles comprising an end region of one of said magnetic shanks, said end regions being largely of the same material, and wherein said poles are separated by a predetermined gap width and have predetermined widths that are transverse to the direction of motion;

an intermediate area between said magnetic shanks, outside of the end regions, through which extend the windings of a write and/or read coil winding;

a connecting region on the side of the guide body facing away from the recording medium where the two magnetic shanks are attached together; and wherein the first magnetic shank at least largely alone carries out the write function, whereas both magnetic shanks carry out the read function, and wherein the magnetic pole associated with the first magnetic shank, which is the leading magnetic shank of the magnetic head with respect to the relative direction of motion of the magnetic head with respect to the magnetizable recording medium, has a greater width transverse to said relative direction of motion than the magnetic pole of the second magnetic shank.

2. The apparatus of claim 1, wherein said magnetic pole of the first magnetic shank has a thickness along the relative direction of motion which is greater than or approximately equal to a corresponding thickness of the magnetic pole of the second magnetic shank.

3. The apparatus of claim 1 wherein the widths of the magnetic poles of the two magnetic shanks, transverse to said relative direction of motion are so chosen that in the magnetizable recording medium write and read tracks which are generated have widths Wb and Rb, respectively, transverse to the direction of relative motion that fulfill the condition:

$$Wb_{min} - Rb_{max} > 4 \times sf,$$

where $Wb_{min}$ is a minimum write track width, $Rb_{max}$ is a maximum read track width and sf is a maximum track guidance error.

4. The apparatus of claim 1 wherein said end regions bordering on the magnetic poles of the magnetic shanks have narrow side faces that form an angle with the relative direction of motion wherein said angle is approximately equal to zero degrees.

5. The apparatus of claim 1 further comprising a substrate formed as an aerodynamic flying body wherein said thin film magnetic head is disposed on a rearward flat face of said substrate.

6. The apparatus of claim 1 further comprising a gap layer comprising a material selected from the group of $Al_2O_3$ and $SiO_2$ between said poles.

7. The apparatus of claim 1 wherein said first and said second magnetic shank each comprise a plurality of laminated thin-film layers.

8. Apparatus of claim 1 wherein said first magnetic pole of said first shank exceeds the width of said magnetic pole of said second shank by greater than 15%.

9. An apparatus including a thin-film magnetic head to be guided over a data track of a perpendicularly magnetizable recording medium comprising:
a magnetic ring core head guide body for carrying a magnetic flux, including a first and a second magnetic shank, wherein each magnetic shank comprises at least one magentic layer with a predetermined magnetic behavior;
two magnetic poles facing the recording medium which are arranged sequentially relative to a direction of motion of the magnetic head with respect to the recording medium, each of said poles comprising an end region of one of said magnetic shanks, said end regions being largely of the same material, and wherein said poles are separated by a predetermined gap width and have predetermined widths that are transverse to the direction of motion;
an intermediate area between said magnetic shanks, outside of the end regions, through which extend the windings of a write and/or read coil winding;
a connecting region on the side of the guide body facing away from the recording medium where the two magnetic shanks are attached together;
wherein first magnetic shank at least largely alone carries out the write function, whereas both magnetic shanks carry out the read function, and wherein the magnetic pole associated with the first magnetic shank, which is the leading magnetic shank of the magnetic head with respect to the relative direction of motion of the magnetic head with respect to the magnetizable recording medium, has a greater width transverse to said relative direction of motion than the magnetic pole of the second magnetic shank;
wherein said magnetic pole of the first magnetic shank has a thickness along the relative direction of motion which is greater than of approximately equal to a corresponding thickness of the magnetic pole of the second magnetic shank; and
wherein said end regions bordering on the magnetic poles of the magnetic shanks have narrow side faces that form an angle with the relative direction of motion wherein said angle is approximately equal to zero degrees.

10. The apparatus of claim 9 further comprising a substrate formed as an aerodynamic flying body wherein said thin film magnetic head is disposed on a rearward flat face of said substrate.

11. The apparatus of claim 9 wherein the widths of the magentic poles of the two magnetic shanks, transverse to said relative direction of motion, are so chosen that in the magnetizable recording medium write and read tracks which are generated have widths Wb and Rb, respectively, transverse to the direction of relative motion that fulfill the condition:

$$Wb_{min} - Rb_{max} > 4 \times sf,$$

where $Wb_{min}$ is a minimum write track width, $Rb_{max}$ is a maximum read track width and sf is a maximum track guidance error.

12. The apparatus of claim 10 wherein the widths of the magentic poles of the two magnetic shanks, transverse to said relative direction of motion, are so chosen that in the magnetizable recording medium write and read tracks which are generated have widths Wb and Rb, respectively, transverse to the direction of relative motion that fulfill the condition:

$$Wb_{min} - Rb_{max} > 4 \times sf,$$

where $Wb_{min}$ is a minimum write track width, $Rb_{max}$ is a maximum read track width and sf is a maximum track guidance error.

13. The apparatus of claim 9 further comprising a gap layer comprising a material selected from the group of $Al_2O_3$ and $SiO_2$ between said poles.

14. The apparatus of claim 9 wherein said first and said second magnetic shank each comprise a plurality of laminated thin-film layers.

15. Apparatus of claim 9 wherein said first magnetic pole of said first shank exceeds the width of said magnetic pole of said second shank by greater than 15%.

* * * * *